June 18, 1929.  H. H. FOLKER  1,717,502
SCALE
Filed April 16, 1925
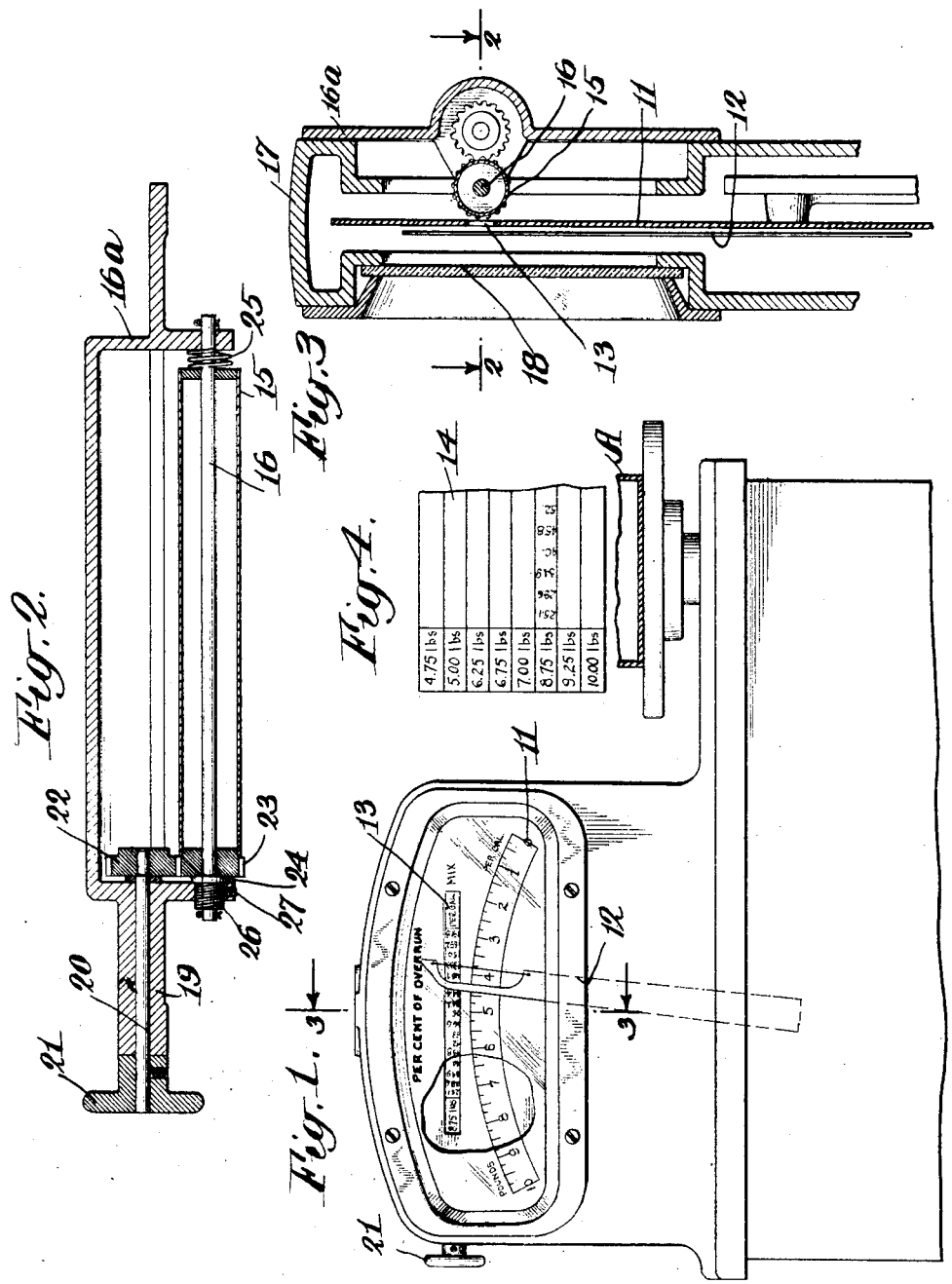

Patented June 18, 1929.

1,717,502

UNITED STATES PATENT OFFICE.

HAROLD H. FOLKER, OF DAYTON, OHIO, ASSIGNOR TO DAYTON SCALE COMPANY, OF DAYTON, OHIO, A CORPORATION OF NEW JERSEY.

SCALE.

Application filed April 16, 1925. Serial No. 23,513.

The present invention is directed to improvements in scales and more particularly is directed to an improvement in the scale shown and described in the patent to E. D. Fear No. 1,504,333. In the scale shown in the said patent provision is made for utilizing a weighing scale for standardizing over-runs in ice cream. A given volume of ice cream or other material is placed in a container and the container is placed upon the platform of a scale and the weight in pounds per gallon is read directly from the weight chart of the scale. In this way the weight per unit volume of the mix is determined. As the ice cream is frozen the same container is utilized and samples of ice cream are taken from time to time as freezing progresses and are weighed on the scale. In the above patent an over-run indicating chart is provided and this chart is first positioned to bring the desired over-run scale corresponding to the weight per unit of the mixture to visual position. Then by reading the over-run scale the various percentage of over-run or under-run can be determined as the respective ice cream samples are weighed.

The present invention has for its object the improvement of the scale shown in the said patent. Provision is made whereby a fixed weight chart may be utilized and in places of using the roller of polygon shape a roller of round form is employed. This permits a greater number of over-run scales to be employed. Readings of the percentage of over-run are preferably effected through a reading aperture in the weight chart.

Other objects of the present invention reside in the provision of a means for mounting the over-run indicator whereby the same may be directly applied to the scale described in Hopkinson Patent No. 1,497,753 without redesigning and rearranging the chart housing of said scale.

A further object of the present construction resides in the provision of a novel mounting for the supplementary indicator, the mounting being so arranged that the supplemental indicator, which in the present embodiment is utilized for the percentages of over-run, may be adjusted laterally relatively to the weight chart.

While the present improvements find particular utility in connection with over-run ice cream scales their use is not limited to such ice cream scales but may be employed in scales of other types where a supplementary chart is desired for use in connection with a weight chart and in which selective portions of the chart are desired to be brought into view by the operator of the scale.

Other objects of the present construction will be hereinafter set forth in the accompanying specification and claims and shown in the drawings.

In the drawings,

Fig. 1 is a front view of a scale embodying my improvements.

Fig. 2 is a detail sectional view of the adjustable chart, the section being taken on line 2—2 of Fig. 3.

Fig. 3 is a central sectional view, the section being taken on line 3—3 of Fig. 1 but with the indicator displaced from the position in which it is indicated in Fig. 1.

Fig. 4 is a fractional view of the standardizing chart.

In more detail in the drawings, the scale to which I have shown the present invention applied is more fully described in Hopkinson Patent No. 1,497,753. The fixed weight chart 11 is retained as before, which chart is traversed by an indicator 12. The chart 11 is provided with a rectangular opening 13 to permit the operator to view readings such as over-run readings which are carried upon a chart 14 suitably supported upon the cylinder 15. The cylinder 15 is preferably rotatably mounted upon a shaft 16, which shaft is carried in a casting or frame-like member 16$^a$ which when assembled in position as shown in Fig. 3 forms a closure for the otherwise open sided extension 17. The use of the glass cover plate heretofore provided at the right of Fig. 1 is thus obviated. On the front or reading side the usual cover glass 18 is retained. Frame 16$^a$ is provided with an extension 19 forming a support for a shaft 20 having a setting knob 21 fixed on one end and a gear 22 fixed on the other. Gear 22 meshes with a gear 23 on the end of the cylinder 15. It will be understood that by rotating knob 21 any desired cross line on chart 14 may be brought to view and in alignment with the opening 13. Inasmuch as it is desirable to provide for a slight longitudinal adjustment of chart 15 in sealing the scale I provide a collar portion 24 on one end of the shaft 16 and a spring 25 intermediate the other end of cylinder 15 and frame 16$^a$. By suitably adjusting an adjustment collar 26 the drum 15 can be adjusted to the desired longitudinal position. After such adjustment is once obtained the collar 26 may be locked by means of a set screw 27.

In the use of the scale for ice cream purposes the scale is first compensated at zero for the weight of the retainer, a fragmentary portion of which is shown at A in Fig. 1. By reading the weight indication on the weight chart 11 the weight of the mix per gallon or unit weight is secured. Knob 21 is then rotated to bring the corresponding unit weight per mix reading of chart 14 in alignment with the window 13. As the freezing operations progress samples are taken from time to time and by taking the reading of the indicator 12 with respect to chart 14 the percentage of over-run can be obtained. It will be understood that this scale is also adapted for other purposes than those particularly pointed out above. In fact the scale may be used in any form of weighing operation wherein a variably graduated chart is provided with a number of columns of readings which are brought to view adjacent a window so that they can be read by the usual scale indicator.

What I claim is—

1. A weighing scale comprising a chart, a chart housing, a removable closure for one side of said chart housing, a roller indicator rotatably supported by said closure, and means for manually rotating the same from without the closure.

2. A weighing scale including a weight chart and indicator, a chart housing, a removable closure for one side of said chart housing, a roller carrying a supplemental chart within the chart housing and journalled in said closure, and means for manually angularly adjusting the supplemental chart from without the chart housing.

3. A supplemental chart device for a weighing scale having a main chart with a reading aperture therein, said device including a roller-like element carrying a supplemental chart, means for rotatably adjusting said roller with respect to said reading aperture, and means for transversely adjusting the said roller and chart carried thereby with respect to said aperture.

4. A weighing scale having a chart housing, a closure for one side of said chart housing, a supplemental chart, a supporting shaft therefor journalled in said closure, a gear on said shaft, a second gear meshing therewith, a shaft fast to said second gear and extending without said closure, and a knob carried thereby for the purpose described.

5. The invention set forth in claim 4 in which means is provided for relatively adjusting the lateral position of the chart supporting shaft with respect to the housing for the purpose described.

6. A weighing scale including a chart housing, a rotatable chart mounted in said housing and means for longitudinally adjusting said chart, said means comprising an operating element extending outside of said housing.

7. A weighing scale including a chart housing, a rotatable chart therein mounted on a shaft journalled in said housing and means for longitudinally adjusting said shaft, said means including an operating element extending outside of said housing.

8. A weighing scale, including a chart housing provided with an aperture, a rotatable chart mounted in said housing adjacent said aperture having a plurality of groups of indications thereon, means comprising an operating element extending outside of said housing for angularly adjusting said chart to present a selected group of indications to view through said aperture and means comprising an operating element extending outside of said housing for longitudinally adjusting said chart.

9. A weighing scale including a chart housing provided with an aperture, a roller like chart having a plurality of longitudinal rows of indications thereon rigidly mounted on a shaft journalled in said housing and in proximity to said aperture, means including an operating element extending outside of said housing for angularly adjusting said shaft to present a selected row of indications on said chart to view through said aperture and means including an operating element extending outside of said housing for longitudinally adjusting said shaft.

10. A weighing scale comprising a chart, a chart housing, a removable closure for one side of said chart housing, a second chart supported by said closure, said latter chart bearing indications having a predetermined relationship to the indications on said first-named chart, and means for adjusting said second chart from without said closure.

In testimony whereof I hereto affix my signature.

HAROLD H. FOLKER.